United States Patent [19]

Farrand

[11] 4,138,253

[45] Feb. 6, 1979

[54] METHOD FOR MAKING A MEMBER OF A POSITION MEASURING TRANSDUCER

[75] Inventor: Clair L. Farrand, Bronxville, N.Y.

[73] Assignee: Farrand Industries, Inc., Valhalla, N.Y.

[21] Appl. No.: 871,164

[22] Filed: Jan. 20, 1978

Related U.S. Application Data

[63] Continuation of Ser. No. 516,049, Oct. 18, 1974, abandoned.

[51] Int. Cl.$^2$ .................. G03C 5/04; G03C 5/00; G03C 5/32

[52] U.S. Cl. .................. 96/27 E; 96/27 R; 96/38.2; 96/44; 96/45.2; 336/123; 318/660; 323/44 R

[58] Field of Search .............. 96/27 R, 27 E, 35, 35.1, 96/36.2, 36, 44, 45.2, 38.2; 336/123; 318/660; 323/44 R

[56] References Cited

U.S. PATENT DOCUMENTS

| | | | |
|---|---|---|---|
| 2,799,835 | 7/1957 | Tripp et al. | 336/123 |
| 3,317,320 | 5/1967 | Reber | 96/36.2 |
| 3,518,084 | 6/1970 | Barson et al. | 96/36.2 |
| 3,647,445 | 3/1972 | Burns | 96/35 |
| 3,950,170 | 4/1976 | Grosholz | 96/27 E |

FOREIGN PATENT DOCUMENTS 1960463 6/1971 Fed. Rep. of Germany.

Primary Examiner—Edward C. Kimlin
Attorney, Agent, or Firm—John L. Downing

[57] ABSTRACT

A method for making an improved member of a position measuring transducer is disclosed, wherein the member has a pattern of uniformly pitched bars thereon. The method comprises the steps of superimposing a plurality of positionally shifted latent images of an initial pattern of bars having approximately uniform pitch upon a photo-sensitive material, and then processing the photo-sensitive material to produce a production pattern of bars having a significantly more uniform pitch than the initial pattern. The production pattern is used to produce an improved member of a position measuring transducer having a correspondingly greater accuracy than a transducer incorporating a member made directly from the initial pattern. A procedure for selection of the processing parameters to control the uniformity of spacing between bars and to adjust the width and relative position of the "gray" transition region at the bar edges is also taught. Finally, the production of improved scale members of INDUSTOSYN ® linear position measuring transformers using the method of the present invention is described.

5 Claims, 9 Drawing Figures

METHOD FOR MAKING A MEMBER OF A POSITION MEASURING TRANSDUCER

This application is a continuation of U.S. patent application Ser. No. 516,049, filed Oct. 18, 1974, now abandoned.

BACKGROUND OF THE INVENTION

1. Field of the Invention

This invention relates to an improved method for making members of position measuring apparatus having thereon patterns of uniformly pitched bars, and to members made by such method.

2. Description of the Prior Art

Precision position measuring apparatus with members having thereon patterns of uniformly pitched bars alternating with spaces are well known in the measurement art. One of the most accurate of such transducers is that manufactured under the trademark INDUCTOSYN and described in U.S. Pat. No. 2,799,835. The INDUCTOSYN transducer is a high accuracy multipole position measuring transformer manufactured in both linear and rotary forms. In either form the transducer employs two relatively movable members, each having a pattern of uniformly linearly or angularly spaced conductor bars positioned thereon by, for example, a photoetching process. The precision and the accuracy of the transducer depend directly upon the uniformity of pitch and positional accuracy of the pattern of conductor bars on its members.

Position measuring instruments which make use of optical rather than electronic techniques also have members with patterns of uniformly spaced bars thereon. Well known transducers of this type include optical shaft digitizers, and devices which employ two superimposed but slightly skewed linear optical gratings to generate fringes which may be counted to measure the relative displacement of the two gratings. Such optical position measuring transducers also depend for their accuracy directly upon the unformity of pitch of the bar pattern on their members.

SUMMARY OF THE INVENTION

The present invention provides an improved method for making a member of a position measuring transducer having a pattern of uniformly linearly or angularly spaced bars thereon formed by an operation utilizing a production pattern of uniformly pitched bars alternating with spaces. The improvement comprises the step of providing an initial pattern of a plurality of bars having approximately uniform pitch, where the pitch may be either a linear distance or an angular displacement, and an unexposed photo-sensitive material. The initial pattern of bars is imaged upon the sensitive material for a predetermined exposure level, positionally shifted relative to the sensitive material by the pitch distance or an integer multiple thereof, and the pattern is again imaged upon the sensitive material for a predetermined exposure step level. The shifting and imaging steps are repeated for a predetermined number of times, and the sensitive material is then photographically processed by copying on another sensitive material to produce a production pattern for use in the above-noted operation to manufacture the position measuring member of the transducer. The pattern of bars on the production pattern produced by this method has substantially greater uniformity of pitch and greater positional accuracy than the initially provided pattern, so that a position measuring transducer incorporating the member produced by the method of the invention exhibits a substantially greater degree of accuracy than that possible with prior methods of manufacture.

The advantages of the method of the present invention are achieved by superimposing a plurality of latent images of a positionally shifted initial pattern of bars upon a photosensitive layer in such a manner that upon development the superimposed latent images produce a more uniformly pitched pattern than the initial pattern. The method of the invention permits the control of the process of superposition, exposure, and development to improve not only the uniformity of spacing between bars, but also to adjust the width and relative position of the "gray" transition region present at the edge of each bar.

Finally, the method of the present invention permits not only the generation of a single production pattern for the manufacture of many improved position measuring device members, but by multiple repetition of the method, each time replacing the initial pattern with the improved production pattern, the method can produce production patterns having an indefinitely high degree of uniformity of pitch, and so be used to produce position measuring transducers of an accuracy never befor obtainable with conventional techniques.

DESCRIPTION OF THE INVENTION

In the production of position measuring apparatus such as INDUCTOSYN transducers a production pattern of substantially uniformly pitched bars is imaged upon a photosensitive resist layer covering a thin metallic layer supported by a base member. Well known photochemical etching techniques are then applied to the exposed resist and metallic layers to etch away the unexposed resist material and the metal beneath it to produce a pattern of conductors which is a replica of the production pattern. (In actual production of INDUCTOSYN transformer members alternating ends of the uniformly pitched bars are interconnected to form a sinuous transformer winding.)

Figure 1:
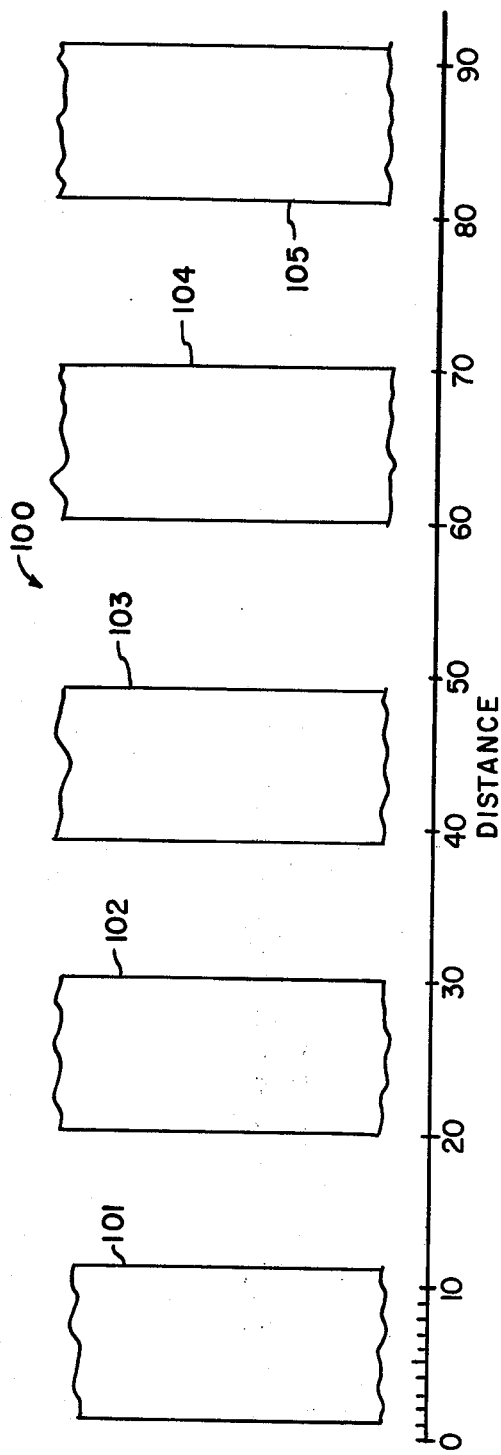
FIG. 1 is a representation of a portion of an initial pattern of bars and spaces suitable for use in the method of the present invention.

A portion of a pattern of bars 100 having approximately uniform pitch is shown in FIG. 1. Five bars 101–105, each having a width of 10 units as measured along the distance scale at the bottom of the figure are separated by varying distances to represent slight nonuniformity of pitch. The "ideal" pattern for the example given here would be bars 10 units wide separated by 10 unit spaces, giving the bars a uniform pitch between center lines of exactly 20 units. In the pattern 100 of FIG. 1, however, it can be seen that bar 101 is spaced from bar 102 by only 9 units; bar 102 is spaced from bar 103 by 9 units; bar 103 is spaced from bar 104 by 11 units; and bar 104 is spaced from bar 105 by 11 units. The illustrated pattern 100, therefore, does not have exact uniformity of pitch. (It will be understood that the pattern 100 of FIG. 1 is given solely for the purposes of explaining the present invention, and that in practice, patterns of bars useful in the production of position measuring apparatus may have different width/space ratios and much less exaggerated pitch nonuniformity than that illustrated in the pattern of bars 101–105.)

It is the purpose of the method of the present invention to take a pattern of bars such as that shown in FIG. 1, hereinafter called an "initial pattern", and from that initial pattern produce a "production pattern" which duplicates the initial pattern but which has a substantially greater uniformity of pitch. The production pattern may be used to produce members of position measuring transducers having significantly greater accuracy than devices incorporating similar elements made from the initial pattern. To accomplish this, the initial pattern is imaged upon a photo-sensitive material. The first imaging step is for a predetermined exposure step level which is a fraction of the available exposure range of the material. The initial pattern is then moved relative to the photo-sensitive material by one pitch distance (or an integer multiple of the pitch distance of the bars) of the initial pattern) and imaged again upon the photo-sensitive material for another predetermined exposure step level. This procedure of positionally stepping the initial pattern and imaging the pattern is repeated for a plurality of times, each exposure step contributing to the build-up of a latent image on the photosensitive material. After a predetermined number of exposure steps are made the photo-sensitive material is processed to develop and fix the latent images, producing a pattern of resulting density on the material which has greater pitch uniformity than the initial pattern.

Figure 2:
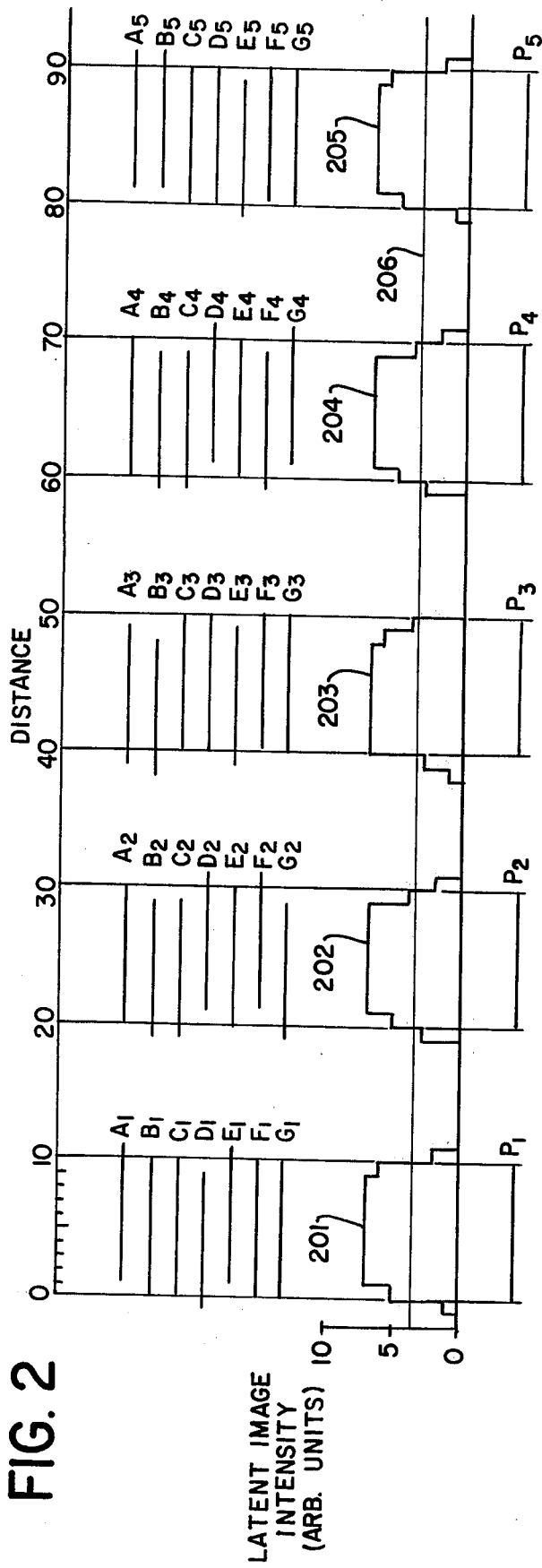
FIG. 2 is a schematic representation of a photo-sensitive layer having thereon a plurality of latent images of the initial pattern of FIG. 1 positionally shifted in accordance with the method of the invention.

For the purpose of explanation solely, FIG. 2 gives a schematic representation of the creation of the latent images on the photo-sensitive material. FIG. 2 shows seven sets of superimposed bar patterns $A_{1-5}$, $B_{1-5}$, $C_{1-5}$, $D_{1-5}$, $E_{1-5}$, $F_{1-5}$ and $G_{1-5}$. Each of these sets may be thought of as sets of bars from the pattern 100 partially shown in FIG. 1 viewed end on, and in which the bars represent transparent areas through which light may pass to the photo-sensitive material and in which the spaces between the bars are opaque. When the initial pattern is imaged upon the photo-sensitive material (represented as layer 200 in the figure) for the first exposure step, light passes through the bar set $A_{1-5}$ to produce a latent image of one unit of intensity on the layer 200. When the bar pattern 100 is positionally shifted, a new set of bars, $B_{1-5}$, is moved to the approximate location relative to the photo-sensitive layer previously occupied by the set of bars $A_{1-5}$. The imaging of the B set of bars contributes an additional unit of intensity to the latent image being built up on the layer 200. Each of the seven exposure steps of the seven sets of bars represented in FIG. 2 contributes to the latent image formation on the layer 200, and the total latent image intensity at the five bar positions shown is represented by curves 210–205, each showing a latent image intensity ranging from 0 to 7 in arbitrary units.

By reference to the distance scale at the top of FIG. 2 it may be seen that although all 35 bars in the seven bar sets A–G are exactly 10 units wide, not one of the sets contains a spacing between bars of exactly 10 units, and the seven sets of bars therefore have a distinct nonuniformity of pitch. However, if the latent images represented by the curves 201–205 are processed in such a manner that the transition between transparency and opacity (or black and white) in the developed photosensitive material occurs wherever a latent image intensity of 3 units or greater is attained, then the resulting pattern produced on the photosensitive material as depicted in FIG. 2 corresponds to the vertical projection of the portions of the energy curves 201–205 exceeding a value of 3 units. A threshold line 206 is drawn at a valve of 3.5 units for convenience of illustration, and the vertical projections of the curves 201–205 from that line are shown as bars $P_{1-5}$, representative of the production pattern of bars produced on the photo-sensitive material. Again, by reference to the distance scale at the top of FIG. 2 it can be seen that the production pattern of bars $P_{1-5}$ so produced has an improved uniformity of pitch compared to the bar sets A–G of the initial pattern, and in fact in the simplified example of the illustration the bars $P_{1-5}$ are all 10 units wide and all have a 10 unit spacing — a theoretically perfect uniformity of pitch.

By choosing different threshold levels of latent image intensity production patterns having different degrees of pitch and positional uniformity may be obtained. The determination of a particular threshold level may also be thought of as the selection of a particular fraction of the total superimposed bar images which is to be retained on the finished processed photo-sensitive material, the remaining bar images being discarded. Optimum selection of this threshold level results in the retention of bar images more closely approximating the "ideal" pattern, and the loss of those images having greater non-uniformities.

It should be emphasized at this point that the preceeding discussion regarding FIG. 2, and that figure itself are provided solely for the purpose of teaching the present invention and the inventor's best understanding of its operation. No other representations are made regarding the accuracy of that explanation. Howwever, a detailed description of the performance of the method of the invention is set forth hereinafter.

DETAILED DESCRIPTION

In a specific example of the use of the method the initial pattern was a 10 inch (25.4 cm.) long pattern of 200 bars spaced on 0.05 in. (1.27 mm.) centers on a Kodalith (trademark) high contrast photographic glass plate. The bars on the initial pattern had an approximately uniform width of 0.033 in. (0.84 mm.), separated by approximately 0.017 in. (0.43 mm.) spaces with approximately uniform pitch. As described hereinafter several INDUCTOSYN devices were made using this initial pattern and were tested for accuracy to serve as control experiments. It should be noted at this point that the most effective and in fact the only practical way to test the pitch uniformity of such bar patterns used in the production of members of precision position measuring transducers is to test the accuracy of the transducers made incorporating those members. The initial pattern was in negative form, i.e. the bars on the glass plate were transparent and the spaces between bars were opague.

Figure 3:
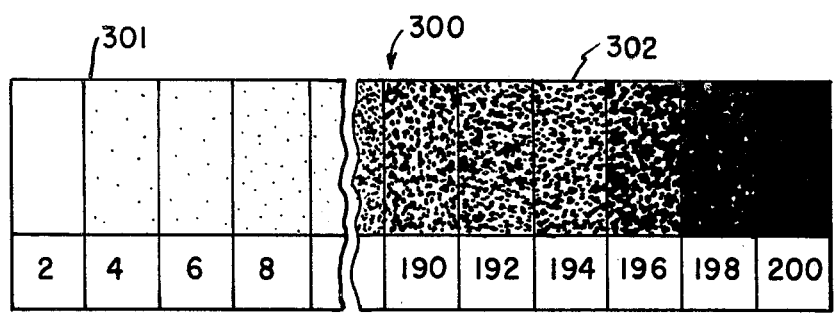
FIG. 3 is a representation of portions of a first photographic test strip useful in the explanation of the method of the present invention.

FIG. 3 shows portions of a test strip made on a Kodak (trademark) High Resolution Plate (HRP) using a test fixture in the following manner. The test fixture, a 10 inch long transparent slot surrounded by an opaque mask, was placed in contact with the unexposed HRP plate, and collimated light from a 25 watt zirconium arc lamp was used to expose the HRP plate through the test fixture for an exposure step of 2 fcs. (foot candle seconds). The test fixture was then moved relative to the HRP plate by 0.1 in. (2.54 mm.) in a direction parallel to the length of the slot, and another exposure of 2 fcs. was made through the test fixture. This process of shifting and exposing for equal 2 fcs. exposure steps was repeated 99 times, and the HRP photographic plate was developed and fixed by standard photographic processing techniques recommended for this photographic material by its manufacturer, Eastman Kodak Company, to produce a test strip 300, the end portions 301 and 302 of which are represented in FIG. 3. The test strip so produced comprises a 100 section gray scale having an exposure range from 2-200 fcs. in. 2 fcs. increments. Each section is identified by an adjacent number signifying the exposure in foot candle seconds received by that section.

Figure 4:
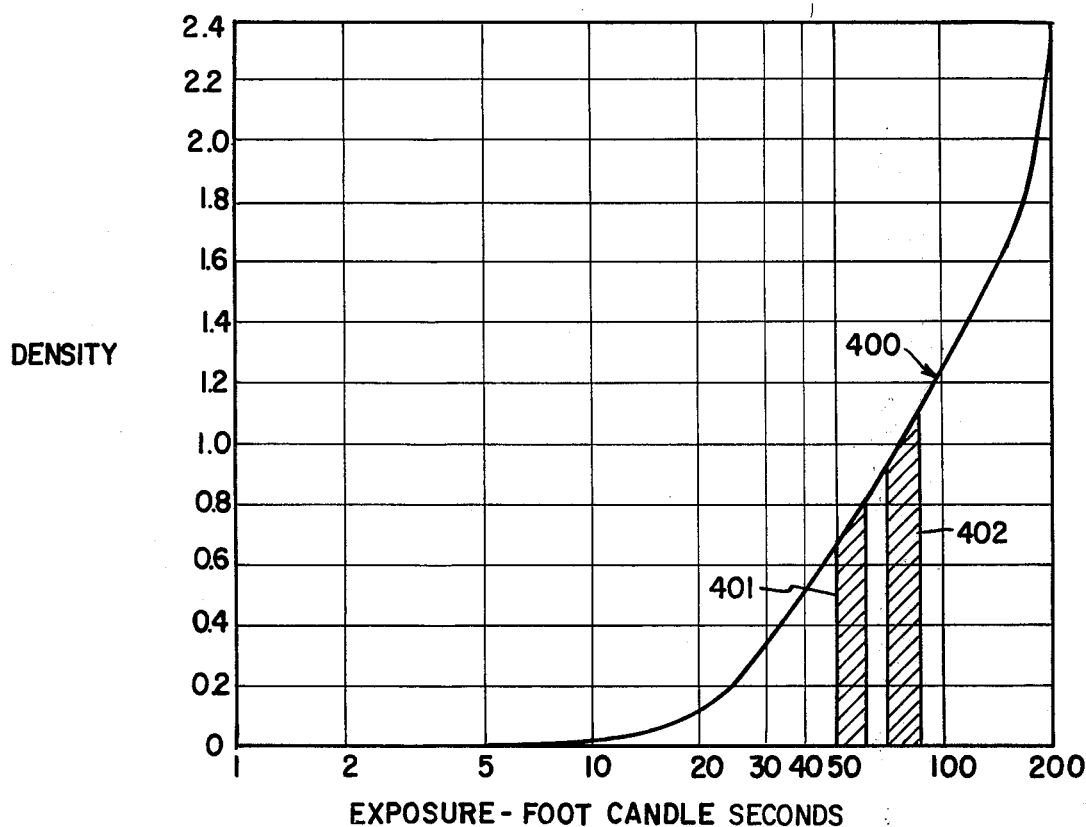
FIG. 4 is the characteristic curve of a photo-sensitive material suitable for use in the method of the invention.

The density of the test strip 300 was measured at each section by means of a Bausch & Lomb densitometer, and the results of that density measurement are plotted with corresponding exposure levels (on a logarithmic scale) in FIG. 4 as the characteristic curve 400 of the HRP material. As may be seen from the curve 400, the HRP photographic material exhibits a substantially linear log exposure/density characteristic between exposure levels of 20 and 200 fcs.

Figure 5:
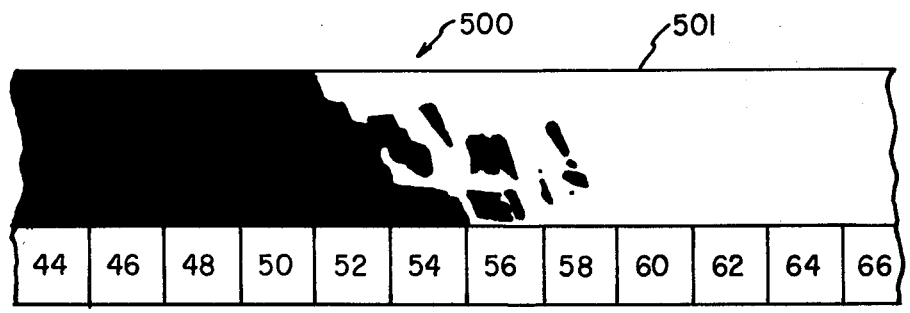
FIG. 5 is a representation of a portion of a second photographic test strip useful in the explanation of the method of the present invention.

The test strip 300 was then contact printed on an unexposed Kodalith photographic plate with a 26 fcs. exposure from a fluorescent light source. The Kodalith plate was developed for 3 minutes in Kodak Kodalith liquid developer and fixed to produce a second test strip 500, a portion 501 of which is represented in FIG. 5. As is well known, the Kodalith material has a much greater gamma or contrast than the HRP material and therefore produces a much sharper transition between transparency and opacity. The portion 501 of test strip 500 represented in FIG. 5 illustrates that under the described conditions of exposure and development the transition region between transparency and opacity occurred on the Kodalith plate at the location corresponding to the 50-60 fcs. exposure sections of the first test strip 300 on the HRP plate, i.e., between the 50 and 60 fcs. exposure points of the characteristic curve 400. This transition region is indicated as an area 401 in FIG. 4. Other test strips made by contact printing the first test strip 300 on Kodalith plates under different exposure and development conditions indicated that increased exposure or development time shifted the transition region of the Kodalith test strips into locations corresponding to higher exposure levels of the first test strip 300. As an example, when a test strip was prepared by contact printing the first test strip 300 on a Kodalith plate with the same 26 fcs. exposure as before, but with a 6 minute development time rather than 3 minutes, the transition region on the Kodalith test strip shifted to the area corresponding to the 68-83 fcs. exposure range on the HRP test strip 300 and the HRP characteristic curve 400. This shifted transition region is shown in FIG. 4 as an area 402. Although not strictly essential for the practice of the method of this invention, the test data acquired as described above permit the intelligent selection of various process parameters, in effect the setting of the "threshold" value for the latent image intensity, as described in the preceeding "Description of the Invention." Thus, it is possible to produce a production pattern of bars by taking the previously described ten inch initial pattern of 200 INDUCTOSYN bars on a Kodalith plate surrounded by an opaque mask and making a contact print on a ten inch long HRP plate by the following process. The bar at the extreme end of the initial pattern is positioned over an end portion of the HRP plate, and HRP material is exposed through the initial pattern for a 2 fcs. initial exposure step with the zirconium arc lamp. The initial pattern is then shifted relative to the HRP material along the pitch path for two pitch distances to bring three bars of the initial pattern over the HRP. The HRP is exposed for another 2 fcs. step, and then these shifting and exposing steps are repeated for a total of 200 steps so that 200 bar locations on the HRP material each receive a total of 100 separate 2 fcs. exposures. The HRP plate is then developed and fixed by standard photographic techniques and contact printed upon a high contrast Kodalith plate with a 26 fcs. exposure and a 3 minute development time in Kodalith liquid developer as described above. The resulting production pattern comprises 200 bars on the developed Kodalith plate and this production pattern may be used to produce improved members of INDUCTOSYN transducers as described hereafter. From the test data gathered it can be seen that the transition region on the Kodalith plate will occur in the 50-60 fcs. exposure region of the HRP material, i.e., areas of the Kodalith plate printed against areas of the HRP plate which have received more than 60 fcs. exposure will be completely transparent, and areas printed against areas of the HRP plate which have received less than 50 fcs. exposure will be completely opaque. Since 100 complete bar pattern images have been superimposed to give a 200 fcs. maximum exposure it can be seen that selection of these processing conditions amounts in effect to discarding approximately 25% (50 fcs./200 fcs.) of the less uniformly pitched pattern images of the total 100 pattern images, while retaining the remaining 75% of the more uniformly pitched bar pattern images.

Alternatively, a production pattern may be produced by exactly the same steps set forth in the preceeding paragraph with the exception that the Kodalith plate may be developed for 6 minutes, for example, rather than 3 minutes. The transition between transparency and opacity on the Kodalith pattern now takes place in the 68-88 fcs. range, or, in other words, approximately 34% (68 fcs./200 fcs.) of the 100 superimposed latent bar images are not retained on the production pattern and the remaining latent bar images are utilized. In accordance with the practice of the present method the difference between the production pattern produced under these conditions and the production pattern described immediately above is manifested in a slight positional shift of the bar edges and a small change in the width of the "gray" transition region at the edge of each bar. These differences slightly affect the pitch uniformity of the production pattern, and depending upon the exact nature of the pitch non-uniformities of the initial pattern, one of the two production patterns will have a better uniformity of pitch than the other.

Although not essential in the practice of the present invention, it is advantageous and convenient if all the step exposures occur on a substantially linear portion of the density/log exposure curve so that each step contributes an exponentially equal amount of density. The characteristic curve 400 for the HRP material shown in FIG. 4 has a relatively short portion of non-linearity in the 0–20 fcs. exposure range, so that only ten 2 fcs. exposures are required before a substantially linear portion of the curve is reached, and the remaining 90 exposure steps are combined "linearly". However, in order to ensure that all exposure steps are made on the substantially linear portion of the characteristic curve 400 it is possible to give the HRP material a preliminary overall pre-exposure of 20 fcs. before beginning the shifting and exposure stepping process.

The selection of process parameters may be further explained by reference to FIG. 6 which shows a characteristic curve 600 such as that of the HRP material having a substantially linear density range between a lower exposure value 601 and a higher exposure value 602. An exposure value 603 lying between values 601 and 602 may be selected, based upon the sharpness of the transition region in a Kodalith print (made and processed under predetermined specified conditions) at a location corresponding to an exposure value 603 on a test strip. A total number of exposure steps and a predetermined fraction of those steps whose latent images are to be retained in the production pattern are chosen. With these values selected the magnitude of the individual exposure step level and required pre-exposure value may be calculated as follows. Since the total number of exposure steps are to be made up to the higher exposure value 602, and the latent images of the fraction of the total steps are to be retained, then that fraction of the steps must be made between exposure values 603 and 602, and therefore the exposure step level equals the difference between exposure values 603 and 602 divided by the predetermined fraction of total steps. The remaining steps are made at exposures below the value 603 and occupy an exposure range equal to the exposure step level multiplied by the number of remaining steps. Given these values, the required pre-exposure value to be given uniformly to the HRP plate overall before the sequence of exposure steps is begun is found to be equal to the selected exposure value 603 less the product of the exposure step level multiplied by the number of remaining steps.

Figure 6:
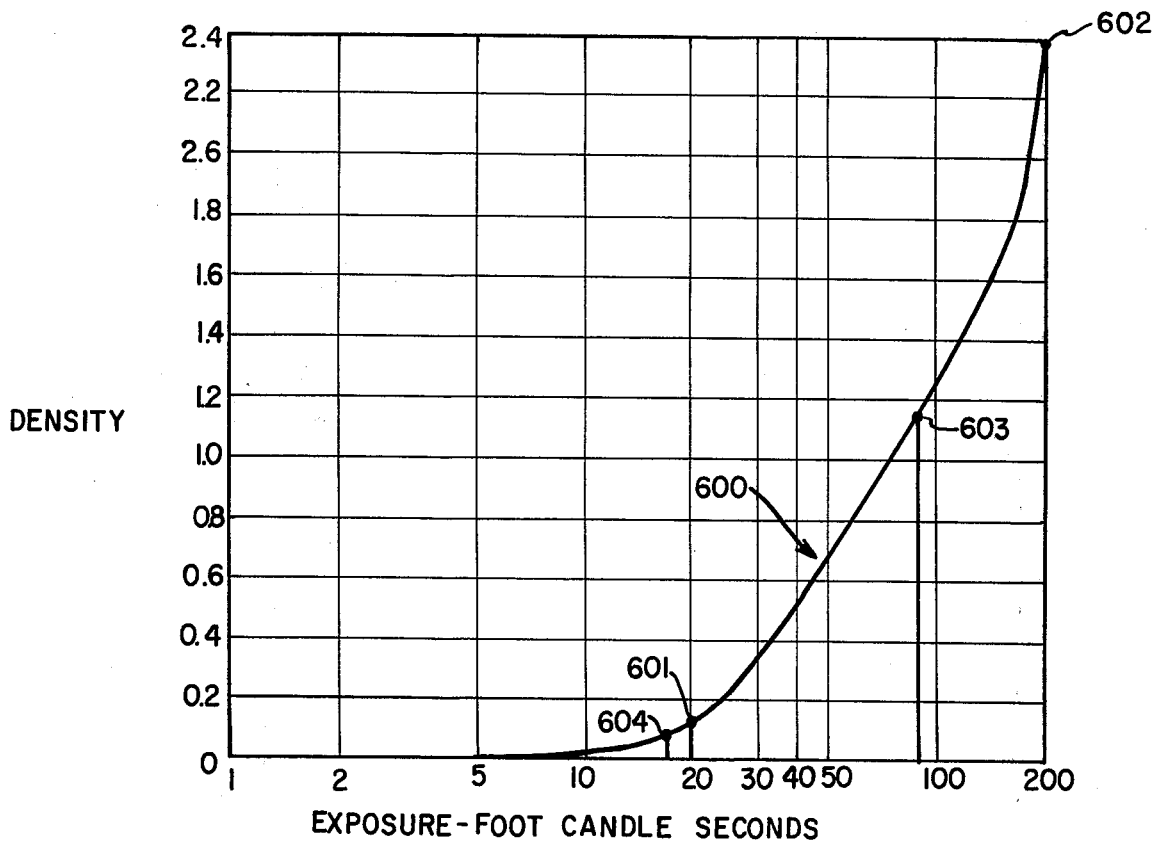
FIG. 6 is the characteristic curve of FIG. 4 showing an example of the determination of process parameters in accordance with the method of the present invention.

As an example, illustrated in FIG. 6, if a higher exposure value 602 of 200 fcs. is to be reached after a total number of 100 steps, and if 60 of the 100 latent images are to be retained above a selected exposure value 603 of 90 fcs. then the individual exposure step level equals (200−90)/60, or 1.83 fcs. The pre-exposure level 604 to be given to the HRP plate equals 90−1.83(100−60), or 17 fcs.

Therefore, in the illustrated example in FIG. 6 the preliminary pre-exposure occupies the portion of the curve 600 from the origin to that point 604 on the curve having an exposure value of 17 fcs. The first 40 1.83 fcs. exposure steps occur in the region of the curve 600 between points 604 and 603; the remaining 60 steps occur in the region between points 603 and 602. Upon development of the HRP material and subsequent printing on the Kodalith plate the resulting production pattern will have retained the image contributions of 60 of the more uniformly pitched bar patterns of the total 100 superimposed patterns and have discarded 40 of the less uniformly pitched patterns. It should be understood that the image contribution of a retained bar pattern may occur at any point in the 100 step sequence, either in the region between points 604 and 603 or the region between points 603 and 602.

In testing the accuracy of a production pattern on a member of a position measuring transducer made in accordance with the method of the present invention the following procedure was followed. An initial pattern of 200 bars having a substantially uniform pitch of 0.05 in. (1.27 mm.) on a ten inch Kodalith glass plate as described above was used to manufacture four INDUCTOSYN transducer scale members. For each of the scale members the initial pattern was contact printed with ultra-violet light on a layer of Kodak Ortho Resist (KOR) photo-sensitive etch resistant material covering a 0.002 in. (0.051 mm.) thick layer of copper laminted to a 0.375 in. (9.5 mm.) thick steel support element. A thin insulating layer separated the copper from the steel support element. The KOR and copper layers were then processed by standard photochemical etching techniques well known to those skilled in the art to produce a pattern of conductor bars on the support element.

Figure 7:
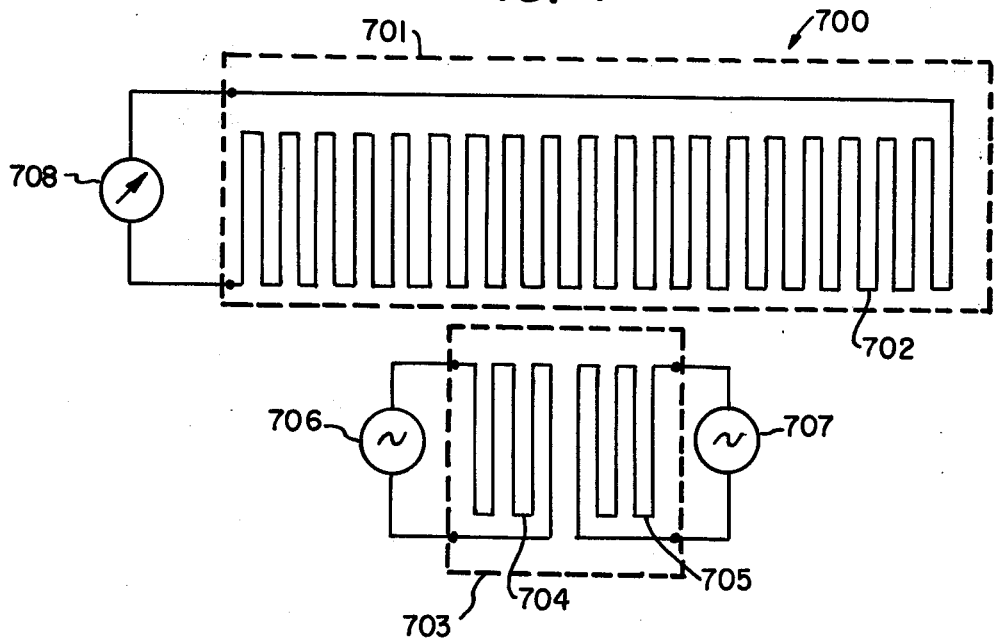
FIG. 7 is a schematic diagram of a linear INDUCTOSYN position measuring transformer incorporating a scale member produced in accordance with the method of the present invention.

A schematic diagram of a linear INDUCTOSYN transducer 700 and related circuitry appears in FIG. 7. A scale member 701 of the transducer is composed of a winding 702 of copper conductors formed as described above, the winding having 200 parallel bars pitched on 0.05 in. (1.27 mm.) centers, the alternating ends of the bars being connected to form a sinuous winding as shown schematically in the figure. A slider member 703 having two sections 704, 705 of similarly pitched windings in space quadrature is mounted in spaced opposition to the scale winding 702 and arranged for linear movement relative to the scale winding 702 along the length of the scale 701. In FIG. 7 the scale winding 702 and slider windings 704, 705 are shown side by side, but in the actual transducer the slider 703 is positioned upon the scale element 701 with a narrow air gap separating the two relatively movable members. Each cycle of the scale winding 702 occupies 0.1 in. (2.54 mm.) and may be considered to represent a displacement angle of 360°. In operation the slider winding sections 704, 705 may be excited by two signals at a fundamental frequency having respective amplitudes proportional to the sine and cosine of a specific angle $\theta$ within a cycle of the scale winding 702. These signals are supplied by sine and cosine signal generators 706 and 707, respectively. As a result of the slider excitation, an "error signal" is induced in the scale winding 702 with an amplitude proportional to the difference between the actual relative displacement between the scale and slider elements 701, 703 within a space cycle and the angle $\theta$. When the actual relative displacement of the slider and scale elements 701, 703 within a 0.1 in. (2.54 mm.) space cycle equals the angle $\theta$ the error signal measured by a voltage detector 708 connected across the scale winding 702 goes to zero. Automatic position readout devices utilizing this basic effect have been developed and are well known to those skilled in the art.

The four INDUCTOSYN scale members produced using the initial pattern directly were tested for accuracy by comparing the electronically indicated slider positions along the length of the scales with the actual slider positions as measured using a Hewlett-Packard Laser Interferometer. The results of those four accuracy tests are plotted as curves 801–804 in FIG. 8.

Figure 8:
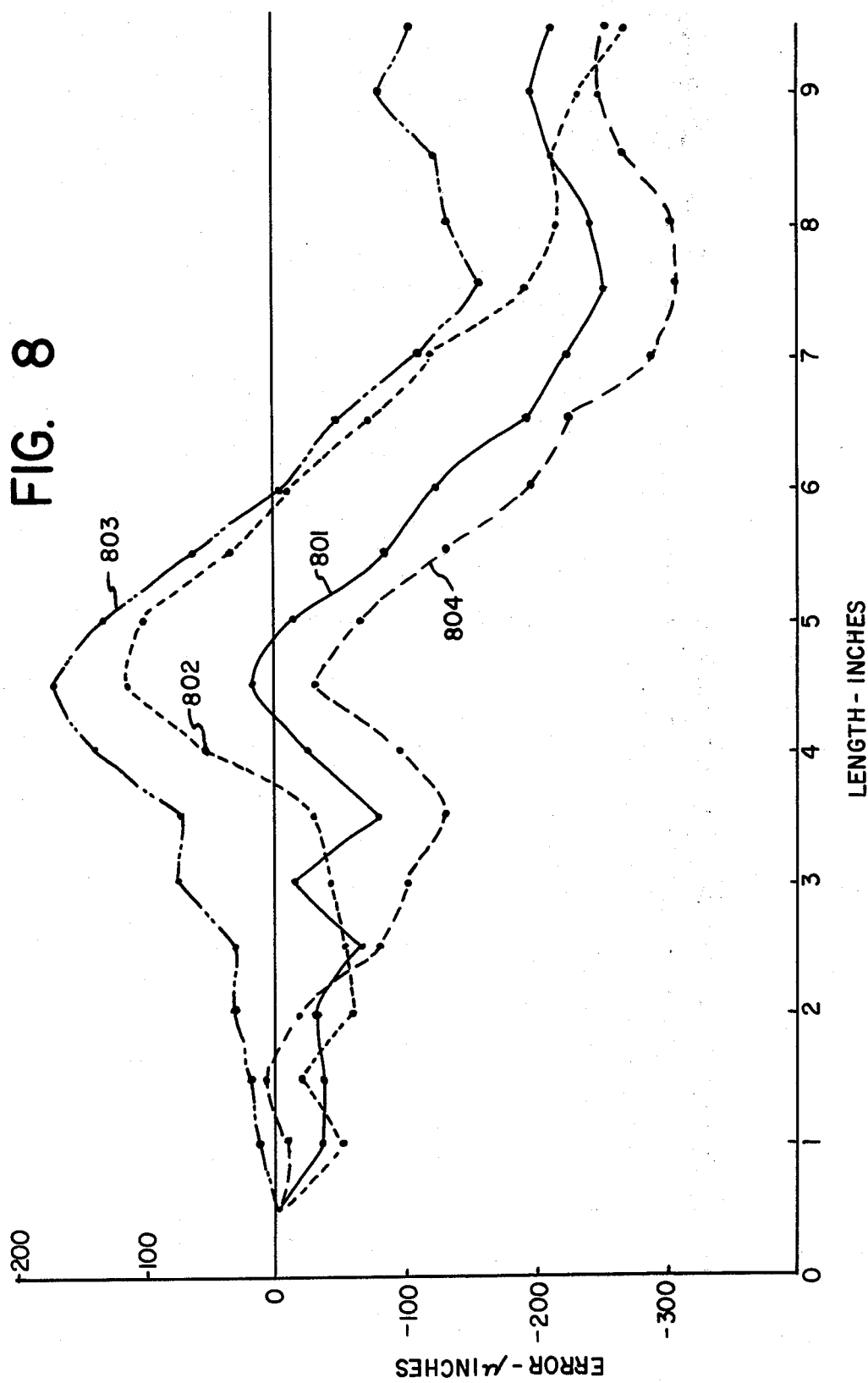
FIG. 8 is a plot of accuracy test results for four INDUCTOSYN scale members made in accordance with the method of the prior art.
Figure 9:
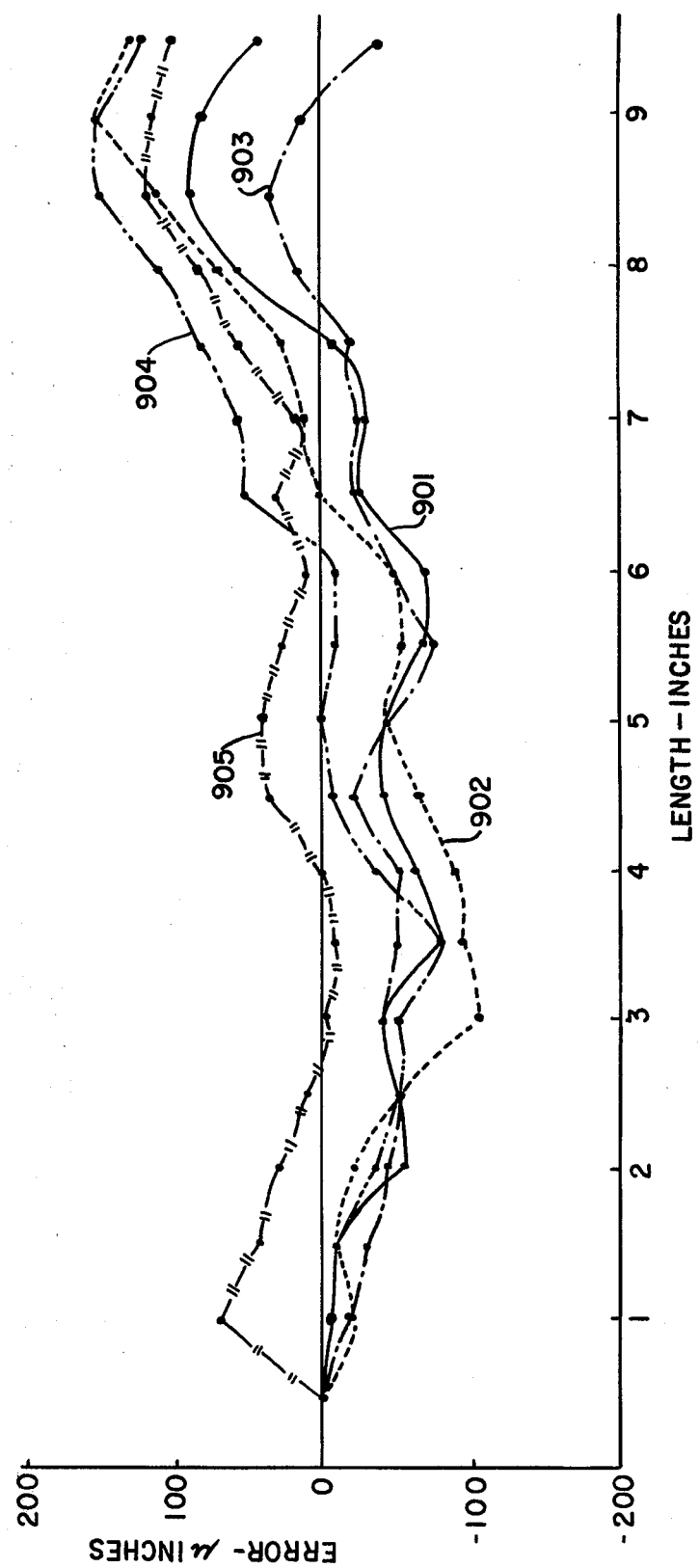
FIG. 9 is a plot of accuracy test results for five INDUCTOSYN scale members made in accordance with the method of the present invention.

The same initial pattern was then used to produce a production pattern by the method of the present invention. Specifically, the initial pattern of 200 bars on the Kodalith glass plate was imaged by contact printing (with no pre-exposure) upon an HRP plate for an initial 2 fcs. exposure as described previously, shifted two pitch distances and imaged again for another 2 fcs. exposure step, the shifting and exposing steps being repeated for a total of 200 steps. The HRP plate was then developed and fixed using conventional photographic techniques to generate an intermediate pattern of 200 bars, each bar having received uniformly 100 separate 2 fcs. exposure steps, and this pattern of 200 bars was then contact printed upon a Kodalith plate with one exposure of 26 fcs., and the Kodalith plate was developed for 3 minutes in Kodalith liquid developer and fixed to produce a production pattern of 200 bars. This production pattern was used in the same manner and under the same conditions as described above to produce five INDUCTOSYN scale members, each corresponding to the scale member 701 represented schematically in FIG. 7, and the accuracy of these scale members was tested using the same slider 703 and measurement apparatus as was used to test the scale elements made by using the initial pattern directly. The results of these accuracy tests are plotted as curves 901–905 in FIG. 9, and it is readily apparent that the INDUCTOSYN scale patterns produced in accordance with the method of the present invention display a significant increase in pitch uniformity and consequent INDUCTOSYN transducer accuracy when compared with the INDUCTOSYN scale patterns produced in accordance with the prior art. Comparison of FIGS. 8 and 9 shows a maximum peak-to-peak excursion of the error curve 802 in FIG. 8 of 385$\mu$ in. (0.0097 mm.), while the largest peak-to-peak error curve excursion of the improved scale elements is shown by curve 902 in FIG. 9 to be only 205$\mu$ in. (0.0052 mm.), approximately one-half that of the prior art scales. It is also apparent that the curves of FIG. 9 are decidedly smoother than those of FIG. 8, and show a much greater accuracy per unit distance of travel.

The method of the present invention has been described using silver halide photographic materials, but it will be understood that other photo-sensitive materials may also be used in the performance of the method.

It will also be noted that although the invention has been described in terms of the generation of patterns of bars uniformly pitched along a linear path to produce an INDUCTOSYN scale the method of the invention may also be used to produce INDUCTOSYN slider members or linear optical gratings, and to generate patterns of radial bars for the manufacture of INDUCTOSYN rotor or stator members, for example. Such members will have improved uniformity of linear or angular pitch, and position measuring transducers incorporating these members will therefore have greater accuracy.

In the detailed description of the present method one production pattern was made from an initial pattern. But it will be apparent that the method may be repeated an indefinite number of times, each time replacing the initial pattern with an improved production pattern to generate production patterns approaching ideal or perfect pitch uniformity. Position measuring transducers incorporating members made from these indefinitely "uniform" patterns will show a corresponding increase in accuracy.

Finally, although in the specific description of the performance of the method of the present invention set forth above equal individual exposure step levels were used, it will be understood that the method described and claimed herein encompasses the use of individual exposure step levels having varying predetermined exposure intensities.

What is claimed is:

1. In a method for making a member of a position measuring transducer having a pattern of uniformly pitched bars thereon formed by an operation in which a production pattern is optically imaged upon a photosensitive surface of said member, said surface thereafter being photo-chemically treated, said production pattern being formed by means of an intermediate pattern, said intermediate pattern, in turn, being formed by means of an initial pattern, the improvement comprising the steps of:

(a) providing said initial pattern of a plurality of bars having substantially uniform pitch;
    (b) providing a first unexposed photo-sensitive material having a density/log exposure ranging between a lower and a higher exposure value;
    (c) imaging said initial pattern upon said first photo-sensitive material for a pre-determined exposure step level;
    (d) shifting the position of the initial pattern relative to the first photo-sensitive material by an integer multiple of said pitch distance, and imaging said initial pattern upon the first photo-sensitive material for another pre-determined exposure step level;
    (e) repeating the preceding imaging and shifting steps a plurality of times;
    (f) processing said first photo-sensitive material to produce said intermediate pattern, wherein said processing is insufficient to produce an apparent image from a latent image produced by a single pre-determined exposure step level;
    (g) imaging said intermediate pattern upon a second photo-sensitive material for a pre-determined exposure, said second photo-sensitive material has a substantially higher gamma photographic characteristic than said first photo-sensitive material; and
    (h) processing said second photo-sensitive material to produce said production pattern, wherein said production pattern has a substantially greater uniformity of pitch and greater positional accuracy than said initial pattern.

2. The method according to claim 1 further comprising a step preceding step (c) therein of:
    exposing uniformly the first photo-sensitive material overall for a pre-determined pre-exposure value.

3. The method according to claim 2 wherein each exposure step level equals the difference between said higher and lower exposure values divided by a total number of steps and wherein the pre-exposure value equals said lower exposure value.

4. The method according to claim 1 wherein each exposure step level equals the difference between the higher exposure value and a pre-determined selected exposure value divided by a pre-determined fraction of a total number of steps, and further comprising a step preceding step (c) therein of uniformly exposing the first photo-sensitive material overall for a pre-exposure value equal to the difference between the selected exposure value and the product of the exposure step level multiplied by the difference between the total number of steps and said pre-determined fraction of the total number of steps.

5. A member of a position measuring transducer by the method of claims 1.

* * * * *